(12) United States Patent
Greshishchev et al.

(10) Patent No.: US 7,558,357 B1
(45) Date of Patent: Jul. 7, 2009

(54) SYSTEMS AND METHODS FOR REDUCING FREQUENCY-OFFSET INDUCED JITTER

(75) Inventors: Yuriy M. Greshishchev, Kanata (CA); Graeme B. Boyd, North Vancouver (CA); Larrie Carr, Anmore (CA)

(73) Assignee: PMC-Sierra, Inc., Santa Clara, CA (US)

( * ) Notice: Subject to any disclaimer, the term of this patent is extended or adjusted under 35 U.S.C. 154(b) by 634 days.

(21) Appl. No.: 11/257,711

(22) Filed: Oct. 25, 2005

Related U.S. Application Data

(60) Provisional application No. 60/622,142, filed on Oct. 26, 2004.

(51) Int. Cl.
  *H04L 25/00* (2006.01)
(52) U.S. Cl. .................. 375/371; 375/373; 375/156; 375/376; 375/355; 375/254; 327/238; 327/165; 327/114; 327/156; 327/49; 327/99
(58) Field of Classification Search ............ 375/376, 375/364, 371, 142, 373, 156, 355, 254; 327/238, 327/165, 114, 156, 49, 99
See application file for complete search history.

(56) References Cited

U.S. PATENT DOCUMENTS

| | | | |
|---|---|---|---|
| 5,835,501 A * | 11/1998 | Dalmia et al. | 714/704 |
| 6,122,336 A | 9/2000 | Anderson | |
| 6,263,034 B1 | 7/2001 | Kanack et al. | |
| 6,771,103 B2 * | 8/2004 | Watanabe et al. | 327/161 |
| 6,954,506 B2 * | 10/2005 | Cho | 375/321 |
| 2003/0118137 A1 | 6/2003 | Skinner | |
| 2004/0071251 A1 | 4/2004 | Sutioso et al. | |
| 2006/0018418 A1 * | 1/2006 | Ichiyama et al. | 375/376 |

OTHER PUBLICATIONS

Sidiropoulos, Stefanos, and Horowitz, Mark A.; A Semidigital Dual Delay-Locked Loop, IEEE Journal of Solid-State Circuits, vol. 32, No. 11, pp. 1683-1692, Institute of Electrical and Electronics Engineers, Nov. 1997.

Sugawara, Mitsutoshi, et. al., "1.5 Gbps, 5150 ppm Spread Spectrum SerDes PHY with a 0.3 mW, 1.5Gbps Level Detector for Serial ATA," 2002 Symposium on VLSI Circuits, Digest of Technical Papers, Institute of Electrical and Electronics Engineers 2002, pp. 60-63.

* cited by examiner

*Primary Examiner*—Chieh M. Fan
*Assistant Examiner*—Eva Puente
(74) *Attorney, Agent, or Firm*—Knobbe Martens Olson & Bear LLp (57) ABSTRACT

Methods and apparatus nullify an intrinsic jitter component in a digital clock recovery circuit induced by a time base frequency difference between an incoming data signal and a local synchronization clock for the digital clock recovery circuit. The techniques disclosed herein permit a recovered clock signal to be digitally filtered and applied to the digital clock recovery circuit clock synthesis unit (CSU) as a synchronization reference clock signal, which advantageously eliminates a time base frequency difference to reduce that jitter component and also reduces an intrinsic jitter component associated with jitter already present in the incoming data signal. In one embodiment, a state machine uses a filtered version of a recovered clock signal as a reference when the frequency of the filtered version of the recovered clock signal is relatively close to the frequency of the CSU reference clock signal.

14 Claims, 7 Drawing Sheets

SYSTEMS AND METHODS FOR REDUCING FREQUENCY-OFFSET INDUCED JITTER

CROSS-REFERENCE TO RELATED APPLICATIONS

This application claims the benefit under 35 U.S.C. § 119 (e) of U.S. Provisional Application No. 60/622,142, filed Oct. 26, 2004, the entirety of which is hereby incorporated by reference.

BACKGROUND

1. Field of the Invention

The invention generally relates to electronic circuits and particularly to timing recovery circuits.

2. Description of the Related Art

Jitter in a digital communication signal is the variation in time of data (or clock edges) from integer multiples of the bit period unit interval (UI) time. In an ideal signal, the edges occur at exact interval times. In a real signal, there is variation in the edge locations due to various phenomena in the signal generation and transmission system.

The reduction of generated jitter is typically an important aspect of a clock and data recovery circuit. In an analog-type clock recovery circuit, phase noise in a signal generated by a voltage-controlled oscillator (VCO) or in a clock synthesis unit (CSU) can contribute a relatively large component to the generation of random jitter. In a digital-type clock recovery circuit, quantizing noise or quantization noise can provide an additional source of intrinsic jitter. A quantizing jitter component is related to the relatively low-frequency phase tap movements that are used to compensate for the difference in frequency between the frequency of a received data signal and a local clock reference. This is an example of intrinsic jitter, because it exists even when the data signal has no jitter.

Phase-locked loop (PLL) based data clock recovery techniques are commonly used in digital communications systems. The Synchronous Optical Networking (SONET) standard provides an example of a communications standard for communicating digital information over optical fibers. Another example is the Synchronous Digital Hierarchy (SDH) standard.

Figure 1:
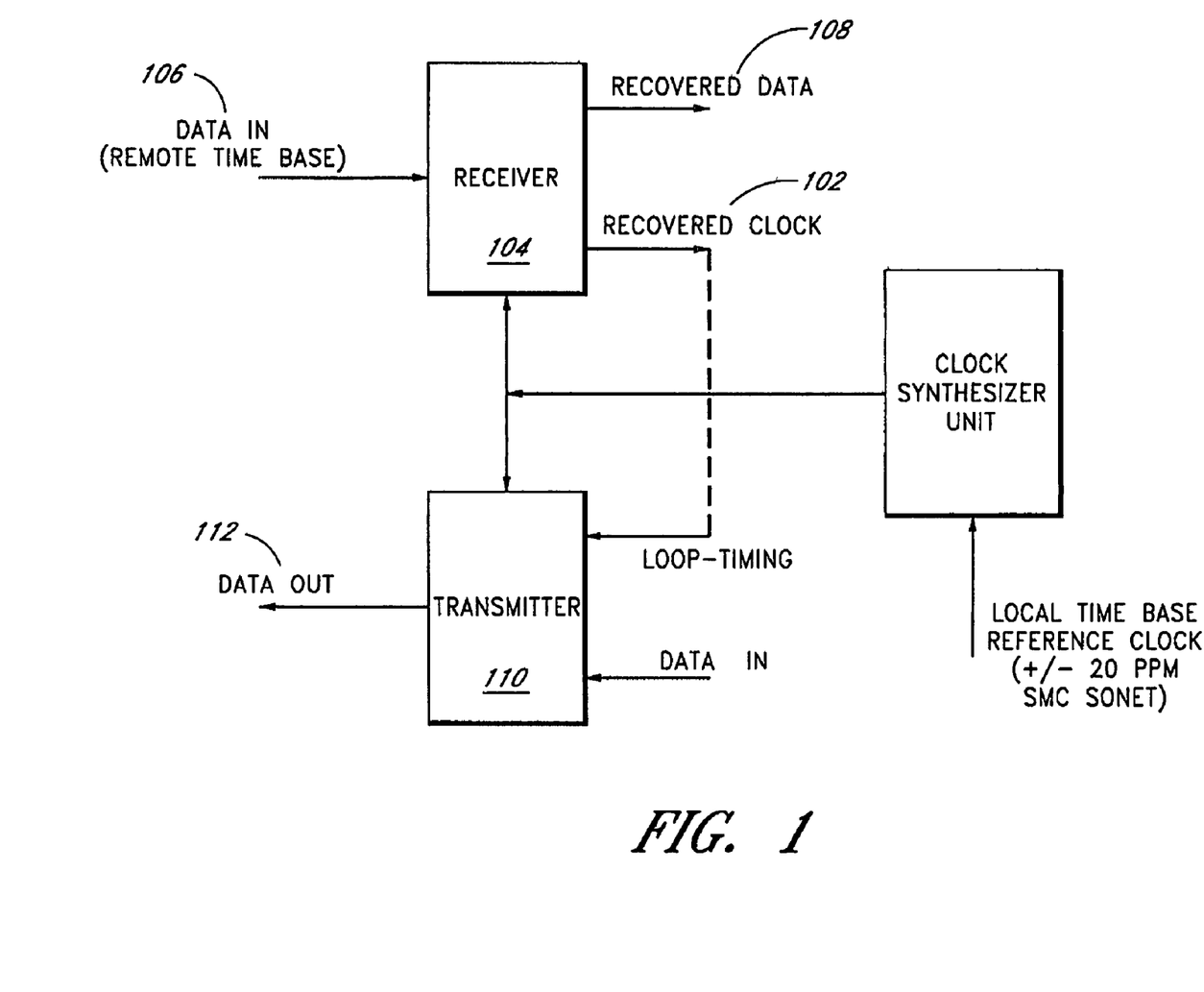
FIG. 1 is a block diagram for a receiver and a transmitter of a digital communications system.

FIG. 1 illustrates a block diagram for a receiver and a transmitter of a digital communications system. A clock signal ("clock") 102 is recovered in the receiver 104 from the incoming data signal 106. The recovered clock signal 102 is used for sampling or recovering the data bits in the receiver 104 and can also be provided as an output signal. For example, the recovered clock signal 102 can be used outside the receiver 104 for timing of other networking elements such as a transmitter 110 as shown in FIG. 1. In a SONET system, the use of the recovered clock signal 102 for timing of an outgoing data signal 112 is referred as a loop-timing mode.

Two types of PLL-based clock recovery circuits are typically encountered: analog and digital. In an analog PLL, a frequency of a voltage-controlled oscillator (VCO) is adjusted to track the phase of the incoming data signal 106. Ring oscillators and LC-type oscillators are examples of analog VCOs.

Digital PLLs employ a digital VCO, which is typically implemented as a phase tap movement or selection technique performed on a number of N phases provided by a clock synthesis unit (CSU). Another example of a digital VCO is a multi-tap delay line with the tap movement or selection technique.

Figure 2:
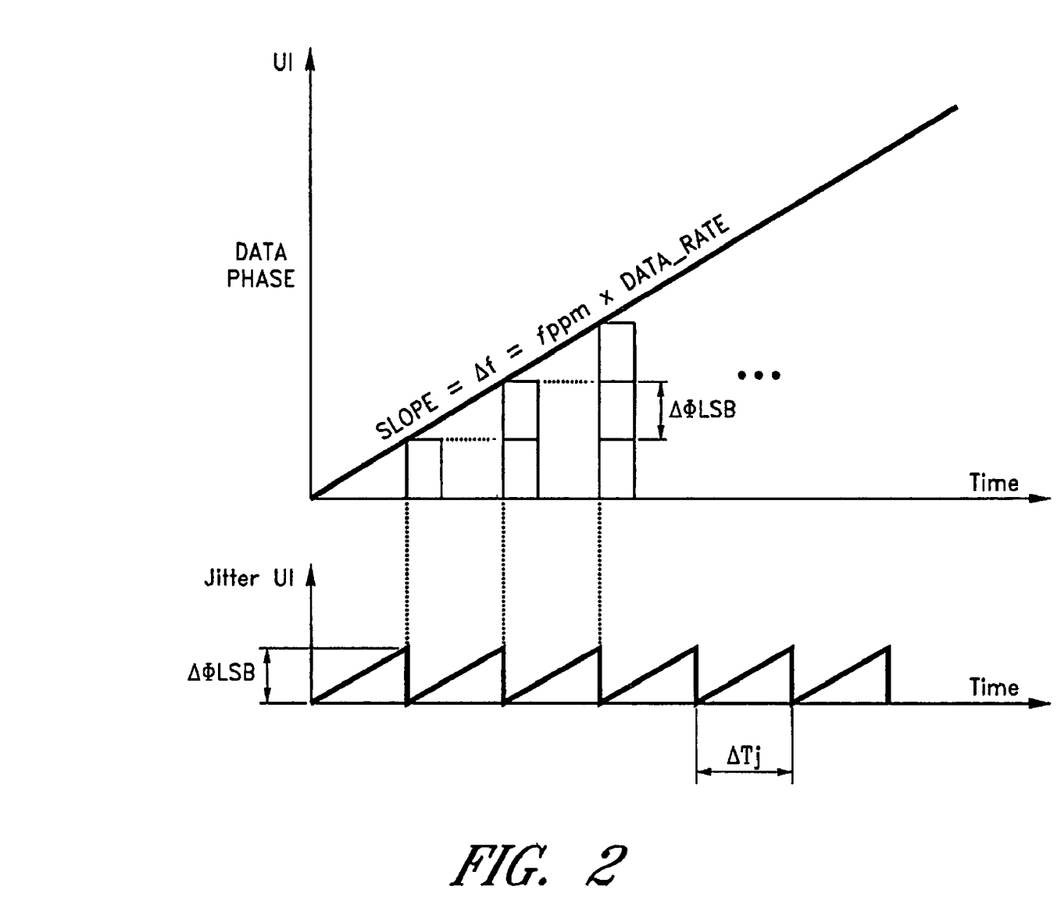
FIG. 2 illustrates phase tracking error in digital clock recovery due to frequency offset between the data and local lock reference.

The long-term relative frequency offset permissible between two frequency sources is typically specified in parts per million (ppm). For instance, the SONET Minimum Clock (SMC) reference clock signal uses a stability $f_{ppm}=+/-20$ ppm, which corresponds to approximately 50 kHz at OC-48 data rates (2.488 Gb/s). As illustrated in FIG. 2, the frequency offset can typically be viewed in terms of data phase as a linear function of time. If the data phase is expressed in unit intervals (UI), then, as depicted in FIG. 2, the phase slope is equal to the absolute frequency difference, $\Delta f$.

Equation 1 expresses the finite phase resolution of a practical digital clock recovery system.

$$\Delta\phi_{LSB}=1/N \text{ [UI]} \quad \text{Equation 1}$$

In Equation 1, N is a number of discrete phases generated by the clock synthesis unit (CSU). In one example, a practical range for the number of phases N is between 10 and 32. However, it will be appreciated by the skilled practitioner that a wide range can apply to the number of phases N, and that the number of phases N will be readily determined by one of ordinary skill in the art.

In the illustrated example, the recovered clock signal exhibits an instantaneous timing jitter with a peak-to-peak amplitude equal to the phase step size, $\Delta\phi_{LSB}$. The instantaneous timing jitter is zero otherwise.

$$J_{GEN\_UIpp} = \Delta\phi_{LSB}, \text{ if } f_{ppm} \neq 0$$
$$= 0, \quad \text{ if } f_{ppm} = 0$$

The root-mean-square (RMS) jitter is expressed by Equation 2.

$$J_{GEN\_UIrms}=J_{GEN\_UIpp}/2\cdot\sqrt{3} \quad \text{Equation 2}$$

The jitter frequency is expressed by Equation 3.

$$\text{Jitter\_freq}=1/T_j \quad \text{Equation 3}$$

In Equation 3, $T_j$ is a phase quantizing error period as illustrated in FIG. 2. From FIG. 2, the relationship expressed in Equation 4 can be observed.

$$T_j=\Delta\phi_{LSB}/\text{SLOPE} \quad \text{Equation 4}$$

In Equation 4, SLOPE corresponds to how fast the data phase in unit intervals (UIs) changes over time as expressed in Equation 5.

$$\text{SLOPE}=\Delta f=f_{ppm}\cdot\text{DATA\_RATE} \quad \text{Equation 5}$$

Combining Equations 1 and 4-6, the jitter frequency can be expressed as:

$$\text{Jitter\_freq}=f_{ppm}\cdot\text{DATA\_RATE}\cdot N \quad \text{Equation 6}$$

For the purposes of illustration, examples of SONET requirements for Jitter Generation are listed in Table 1.

TABLE 1

| SONET requirements for Jitter Generation | | | | |
| --- | --- | --- | --- | --- |
| Optical Carrier Level | Data Rate Mb/s | Max Jitter Generation UI pk-pk | Max Jitter Generation UI RMS | Bandwidth kHz |
| OC-12 | 622.08 | 0.1 | 0.01 | 12-5000 |
| OC-48 | 2488.320 | 0.1 | 0.01 | 12-20000 |

Using the SONET requirements as an example, for a practical range of the number of phases N, such as between 10 and 32, the jitter frequency should be in the SONET frequency specification band. While the use of an even larger number of phases N can provide some benefits, a large number for N also has disadvantages. For example, the number of phases N can be selected to be about 64, which should typically satisfy the maximum SONET jitter generation of 0.01 UIrms requirements with an acceptable margin for error. However, the use of a number of phases N of around 64 disadvantageously significantly complicates the implementation of the digital clock recovery circuit.

Figure 3:
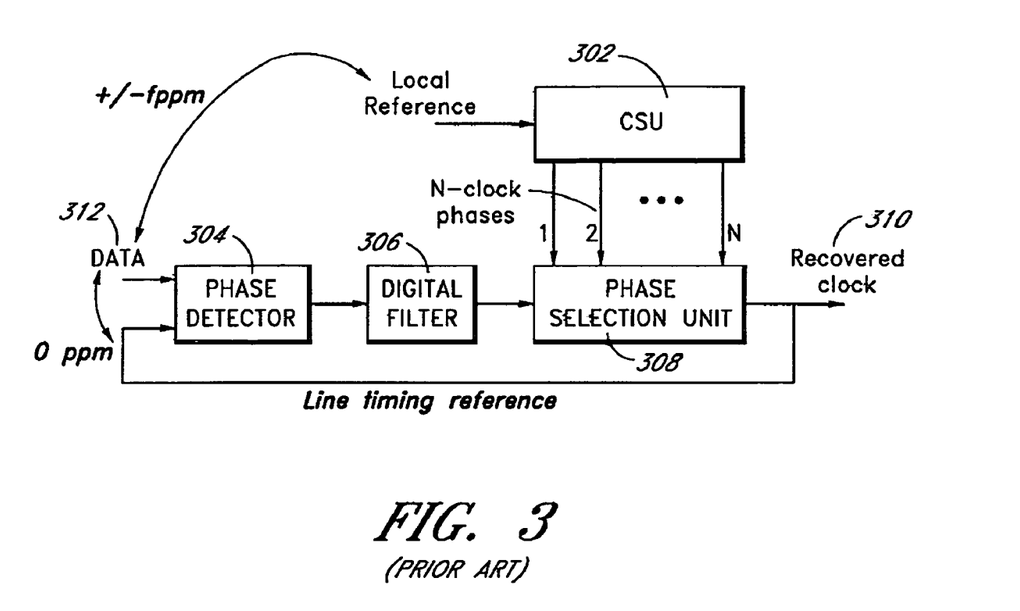
FIG. 3 illustrates a conventional digital clock recovery system.

FIG. 3 illustrates an example of a conventional implementation for a digital clock recovery system. The conventional digital clock recovery system employs a multi-phase clock synthesis unit (CSU) 302 with N phase taps, a phase detector 304, a digital filter 306, and a phase selection unit 308. The clock signal 310 is recovered, while tracking the data phase in the phase-locked loop is performed with the phase selection unit 308, the phase detector 304 and the digital filter 306. Subject to the low-pass filtering by the digital filter 306, the phase selection unit 308 selects the tap of the CSU 302 closest in phase to the received data 312 to generate the recovered clock signal 310.

Those skilled in the art will recognize that alternative implementations to generate N-phases can be used. In addition, clock division techniques can also be used to accommodate particular technical requirements. A common feature to these conventional implementations is a finite phase step $\Delta\phi_{LSB}=1/N$ (UI) or quantizing effect in tracking the data phase.

When a frequency offset $+/-f_{ppm}$ exists between the frequency of the received data signal and the frequency of a local reference, then the clock recovery circuit generates an associated jitter component in the recovered clock signal 310 as described earlier in connection with FIG. 2. One way to reduce this jitter component is to increase the number of phases N, which decreases the size of the associated phase quantizing step. However, as previously described, there exist practical limits, such as cost and/or physical constraints, to the use of relatively large values for N. For example, limiting factors can include: timing accuracy in generating and distributing a relatively large number of N phases, a frequency limit associated with the loop to operate the phase selection unit 308, and the like. Other disadvantages include an increase in die area, chip cost, and an increase in power. Jitter due to a frequency offset $+/-f_{ppm}$ can be observed in prior art clock recovery systems.

Figure 4:
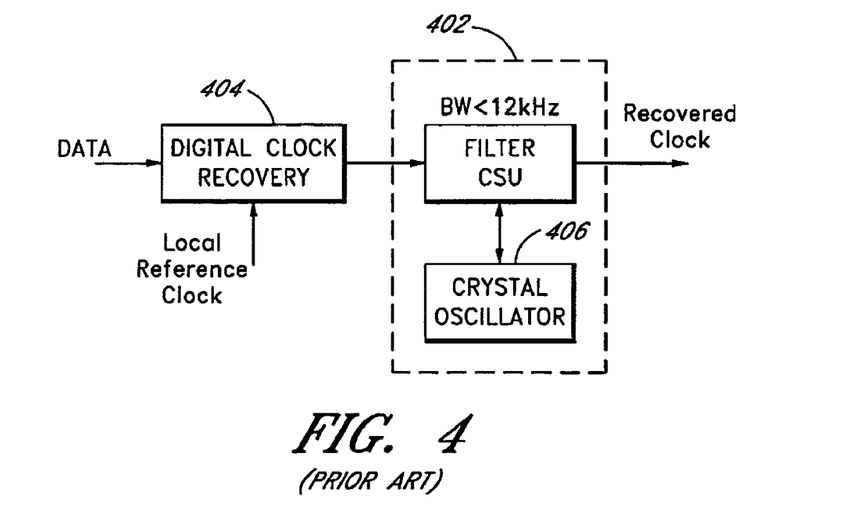
FIG. 4 illustrates a conventional clock recovery system with an analog clock synthesis unit (analog CSU).

FIG. 4 illustrates a conventional clock recovery system with an analog clock synthesis unit (analog CSU) 402. The analog CSU 402 is another conventional technique to reduce jitter in the recovered clock signal for a SONET system.

The bandwidth of an analog CSU 402 is typically set below 12 kHz to suppress the quantizing jitter from the digital clock recovery 404 for the SONET bandwidth as described earlier in connection with Table 1. An implementation of the analog CSU 402 is disadvantageously expensive and mechanically fragile because of the presence of a low-noise crystal oscillator 406 in the analog CSU 402. Other less expensive and less fragile oscillators, such as monolithic oscillators, exhibit relatively high intrinsic phase noise and are typically not satisfactory for filtering in a low-frequency band such as in an analog CSU 402.

SUMMARY OF THE INVENTION

Embodiments of the invention advantageously reduce jitter induced by frequency offsets. A typical source for the frequency offset is the difference in frequency between the received data signal and a local clock reference. The reduction in this frequency-offset induced jitter can improve an associated system's jitter generation characteristics as well as the system's jitter transfer characteristics. In one embodiment, a recovered clock signal is used as a frequency reference for a clock synthesis unit (CSU), which reduces or eliminates a frequency-offset induced jitter in the recovered clock signal.

The techniques disclosed herein can permit relatively inexpensive and efficient circuits, such as those implemented by relatively inexpensive CMOS, to achieve relatively high performance for relatively demanding loop-timing requirements such as, for example, the SONET line interface compliant loop-timing requirements. For example, the techniques can be combined with a relatively inexpensive and efficient digital clock recovery system using a relatively low-resolution CSU (relatively small values of N phases). This can advantageously reduce complexity, cost, power consumption, and the like.

The invention includes an apparatus comprising: a digital clock recovery unit configured to receive a data signal and to generate a recovered clock signal from the data signal and from a CSU clock signal; a state machine having a first input and a second input, the first input operatively coupled to a signal at least based on the recovered clock signal, the second input configured to receive a local frequency reference signal, the state machine configured to select between the first input and the second input to provide a reference signal as an output; and a clock synthesis unit (CSU) operatively coupled to the output of the state machine, the clock synthesis unit (CSU) configured to generate a CSU clock signal at least partially based on the reference signal from the output of the state machine.

The invention also includes an apparatus comprising: means for selecting between a local frequency reference signal and a processed signal as a reference signal, where the local frequency reference signal has a different time base than a data signal, and where the processed signal is at least partially based on the recovered clock signal; and means for generating a recovered clock signal at least partially based on the selected reference signal and the data signal, where the recovered clock signal is synchronous with the data signal.

The invention also includes a method for recovering a clock signal from a data signal, the method comprising: selecting a local frequency reference signal as a reference signal, where the local frequency reference signal has a different time base than the data signal; generating a recovered clock signal based at least partially on the local frequency reference and the data signal; selecting a processed signal based at least partially on the recovered clock signal as a new reference signal; and using the new reference signal as a timing reference signal for further generation of the recovered clock signal from the data signal.

BRIEF DESCRIPTION OF THE DRAWINGS

These drawings and the associated description herein are provided to illustrate specific embodiments of the invention and are not intended to be limiting.

DETAILED DESCRIPTION OF SPECIFIC EMBODIMENTS

Although particular embodiments are described herein, other embodiments of the invention, including embodiments that do not provide all of the benefits and features set forth herein, will be apparent to those of ordinary skill in the art.

The jitter reduction techniques are applicable to a wide range of digital clock recovery circuits or digital clock recovery units (DCRUs) that track an input signal phase with a phase-locked loop. The disclosed techniques can ameliorate the effects of a frequency offset between a received data signal and a reference clock signal. In addition, while described in the context of digital clock recovery, the principles and advantages described herein are also applicable to other areas such as jitter-filtering in clock generation applications. In a clock generation application, a type of input information for the jitter reduction technique will typically be a periodic signal, for example, a reference clock signal, instead of random or apparently random data.

The jitter reduction technique can be applied to virtually any digital clock recovery circuit with a phase-locked loop for data phase tracking having a limited number of N-phases that can be generated synchronously with a local reference clock in a clock synthesis unit (CSU). One embodiment of a digital clock recovery according to the illustrated jitter reduction technique operates in the following manner. Initially, the state machine sets up the CSU reference clock signal to be the local reference clock signal. The data phase can be tracked by a relatively close phase, such as the closest phase, of the N-phases generated by the CSU, and a data clock signal can begin to be recovered. When the frequency of the recovered clock signal is in relative proximity with the data frequency, the state machine switches the reference clock signal used by the CSU from the local reference clock source to a filtered version of the recovered clock signal. The digital filtering provides stability for the closed-loop feedback system and furthermore cleans up the recovered clock signal from jitter present in the data signal. In one embodiment, two jitter reduction mechanisms are present: elimination or at least reduction of an intrinsic jitter component due to a frequency difference between the data source and a local frequency reference; and data signal jitter attenuation with a digital filter, such as a digital phase-locked loop.

Figure 5:
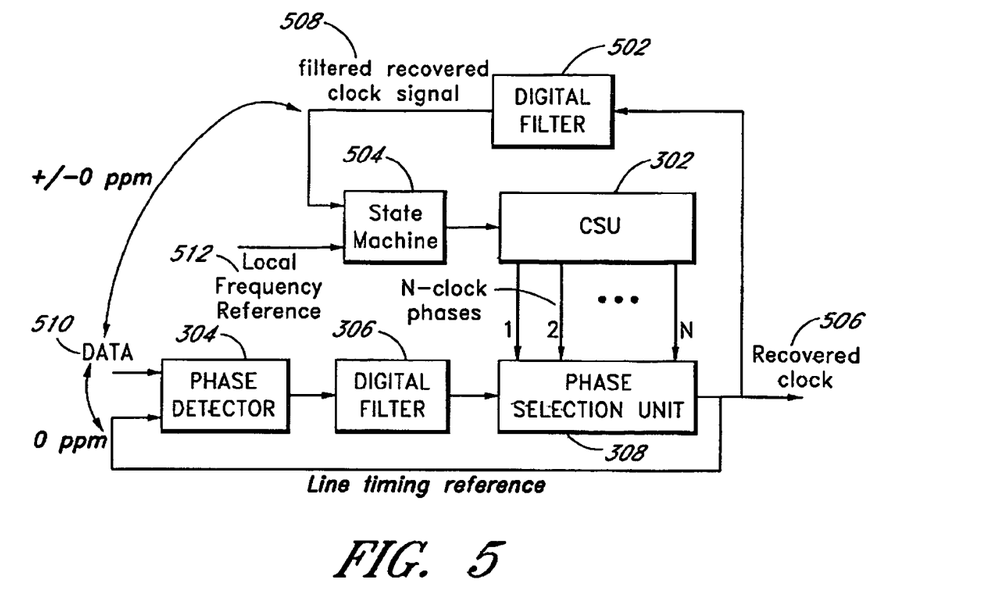
FIG. 5 illustrates a representative example of a clock recovery system according to an embodiment of the invention.

FIG. 5 illustrates a representative example of a clock recovery system according to an embodiment of the invention. In comparison with the clock recovery system described earlier in connection with FIG. 3, the illustrated embodiment of FIG. 5 has a second digital filter 502 and a state machine 504.

The second digital filter 502 is coupled to the recovered clock signal 506 as an input and filters the recovered clock signal 506 to generate the filtered recovered clock signal 508, which can be used as a timing reference for the multi-phase clock synthesis unit (CSU) 302. The second digital filter 502 low-pass filters changes in frequency or phase of cycles of the recovered clock signal 506, that is, steadies the variations in intervals between cycles. The second digital filter 502 is characterized by a dominant low-pass frequency pole, which reduces the jitter in the recovered clock signal 506 from sources such as the received data signal 510 and the jitter associated with the generation of the recovered clock signal 506. The low-pass characteristic also enhances the stability of a feedback loop from the phase selection unit 308, the second digital filter 502, the state machine 504, and the CSU 302.

The state machine 504 is configured to select between the local frequency reference 512 and the filtered recovered clock signal 508 as a frequency reference for the CSU 302. In one embodiment, the state machine 504 selects the filtered recovered clock signal 508 as the frequency reference when the filtered recovered clock signal 508 is within the frequency locking range of the CSU 302 (or CSU 604 in FIGS. 6, 7, and 9).

In one embodiment, the CSU 302 provides a clock signal with a frequency that is an adjustable R times of a reference frequency, e.g., the frequency of the local frequency reference 512 or the frequency of the filtered recovered clock signal 508, where the value of R is greater than zero. For example, in one embodiment, the CSU 302 multiplies the frequency from 77 MHz at an input to 622 MHz at an output. It will be understood by the skilled practitioner that the illustrated embodiment can be modified in a wide variety of ways. For example, in one embodiment, the CSU 302 is oscillator-based and can generate a clock signal even when a reference clock signal, such as a local frequency reference 512, is not available.

One example of operation of the digital clock recovery system will now be described.

1. The local frequency reference 512 is selected by the state machine 504 as an input for the CSU 302.
2. When the filtered recovered clock signal 508 becomes relatively close in frequency to the frequency of the local reference frequency 512, the state machine 504 selects the filtered recovered clock signal 508 as the reference for the clock synthesis unit (CSU) 302. In one embodiment, the state machine 504 selects the filtered recovered clock signal 508 as the reference when the filtered recovered clock signal 508 is within the frequency locking range of the CSU 302.
3. It should be noted that the switching of timing references that are relatively close in frequency can result in a relatively short "linear" transient until the phase difference is compensated. In one embodiment, no intervention by the state machine 504 is used after the switching.
4. The digital clock recovery circuit can operate using the filtered recovered clock signal 508 as an input until the received data signal 510 becomes present at the input of the phase detector 304.
5. If the data signal 510 is interrupted, then the state machine 504 can switch back to the local reference clock 512. The second digital filter 502 can perform the following:
    a. generate a dominant low-pass frequency pole for relatively good stability in the loop; and
    b. filter data jitter and jitter produced by the digital clock recovery system.

Advantageously, the jitter reduction technique permits the recovered clock signal 506 to be filtered and applied as the filtered recovered clock signal 508 to the digital clock recovery circuit's clock synthesis unit (CSU) 302 as a synchronization reference clock signal, which eliminates or at least partially reduces a time-base frequency difference and an associated intrinsic jitter component. This technique also permits the state machine 504 to determine a condition, such as a relative closeness in frequency between the filtered recovered clock signal 508 and a local reference clock signal 512, to determine when to switch the reference clock signal used by the clock synthesis unit (CSU) 302 from a local time base to the time base recovered from the incoming data.

A number of variations are possible. For example, in another embodiment, the filtering provided by the second digital filter 502 can be implemented instead with an analog-type of PLL filter.

Figure 6:
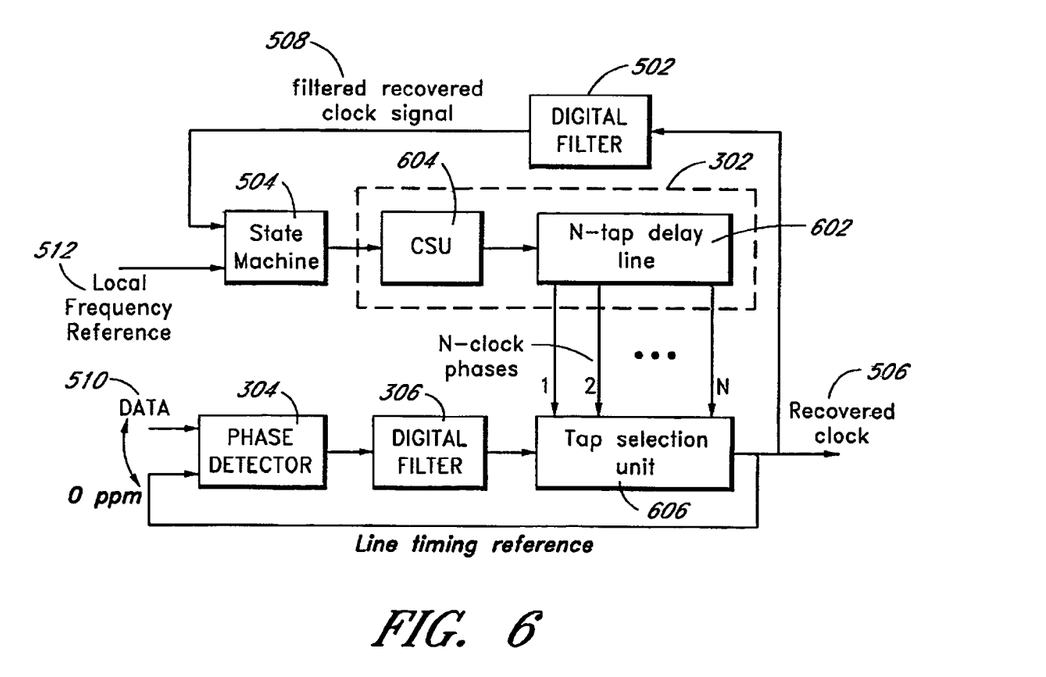
FIG. 6 illustrates further details of an embodiment of a clock and data recovery system and includes an N-tap delay line.

FIG. 6 illustrates further details of an embodiment of a clock and data recovery system and includes an N-tap delay line 602. The N-tap delay line 602 generates multiple phases of a clock signal from a clock synthesis unit (CSU) 604 for selection of a desired phase by a tap selection unit 606 by selection of the appropriate tap. The tap selection unit 606 of FIG. 6 and the phase selection unit 308 of FIGS. 3 and 5 perform the same function. In one embodiment, the CSU 604 is oscillator-based and can generate a clock signal even in the absence of a reference clock signal. The phase detector 304, the digital filter 306, the N-tap delay line 602, and the tap selection unit 606 portion of the clock and data recovery system can collectively be referred to as a digital clock recovery unit (DCRU).

Figure 7:
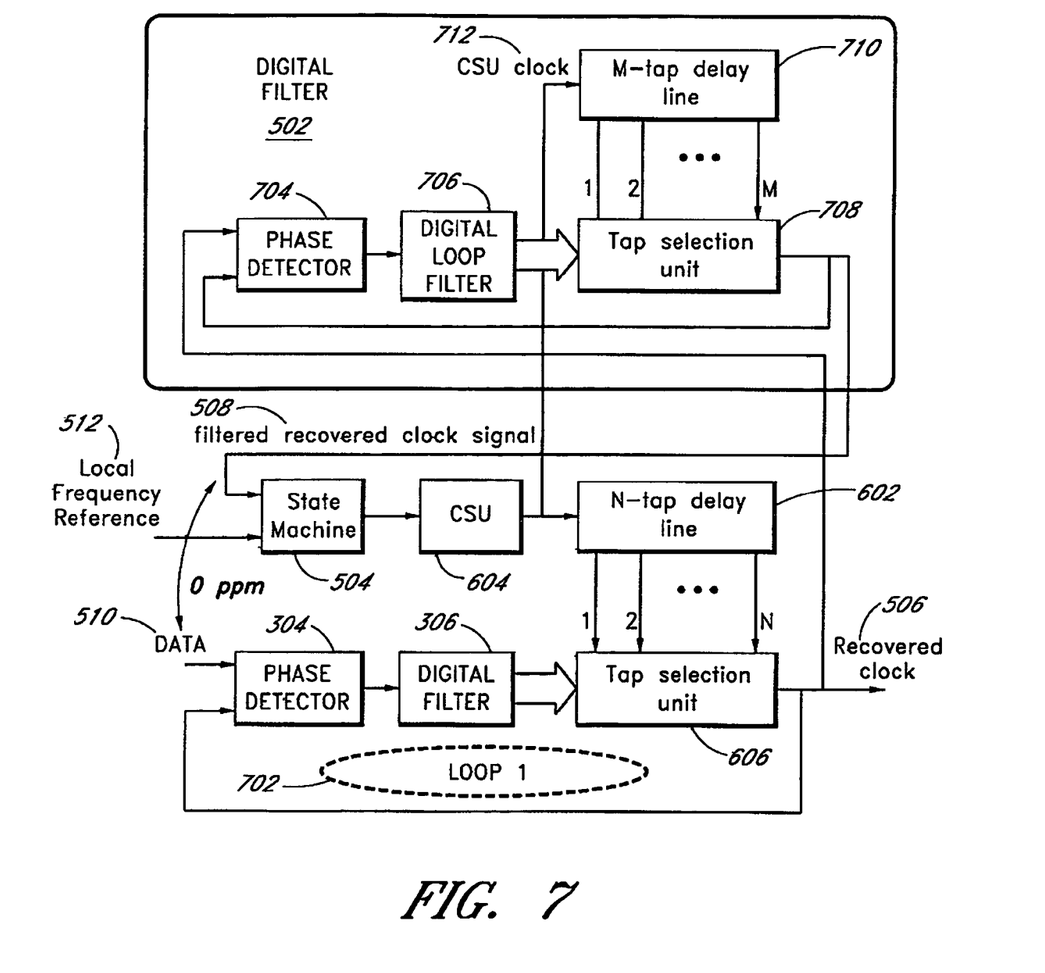
FIG. 7 illustrates further details of an embodiment of a digital filter that can be used with the clock and data recovery system.

FIG. 7 illustrates further details of one embodiment of a clock and data recovery system. In the illustrated embodiment, the second digital filter 502 is implemented with a digital phase-locked loop. This configuration is relatively well suited to high-speed operation. However, other applicable digital filter techniques will be readily determined by one of ordinary skill in the art.

In the illustrated embodiment, the second digital filter 502 is implemented with similar circuitry as the clock recovery loop 702. One advantage of this configuration is that it efficiently permits the sharing of the clock synthesis unit (CSU) 604 for the digital clock recovery portion and the second digital filter 502. The use of the output of the CSU 604, as a frequency source reduces or eliminates the frequency-offset derived jitter in the digital loop of second digital filter 502 in a similar manner as described earlier in connection with the primary digital clock recovery loop 702.

As illustrated in FIG. 7, the second digital filter 502 is implemented with a digital phase-locked loop (PLL) including a phase detector 704, a digital loop filter 706, a tap selection unit 708, and with an M-tap delay line 710. The phase detector compares the phase of the recovered clock signal 506 and the output of the tap selection unit 708. In one embodiment, the output of the phase detector 704 can be a +1 or a −1. The digital loop filter 706 provides a low-pass filter function that is then used by the tap selection unit 708 to select the appropriately delayed phase from the corresponding tap of the M-tap delay line 710.

The second digital filter 502 has a low-pass frequency response with a relatively low frequency bandwidth. This low frequency bandwidth provides loop stability when the filtered recovered clock signal 508 is used as an input to the clock synthesis unit (CSU) 604 as the reference clock signal.

Figure 8:
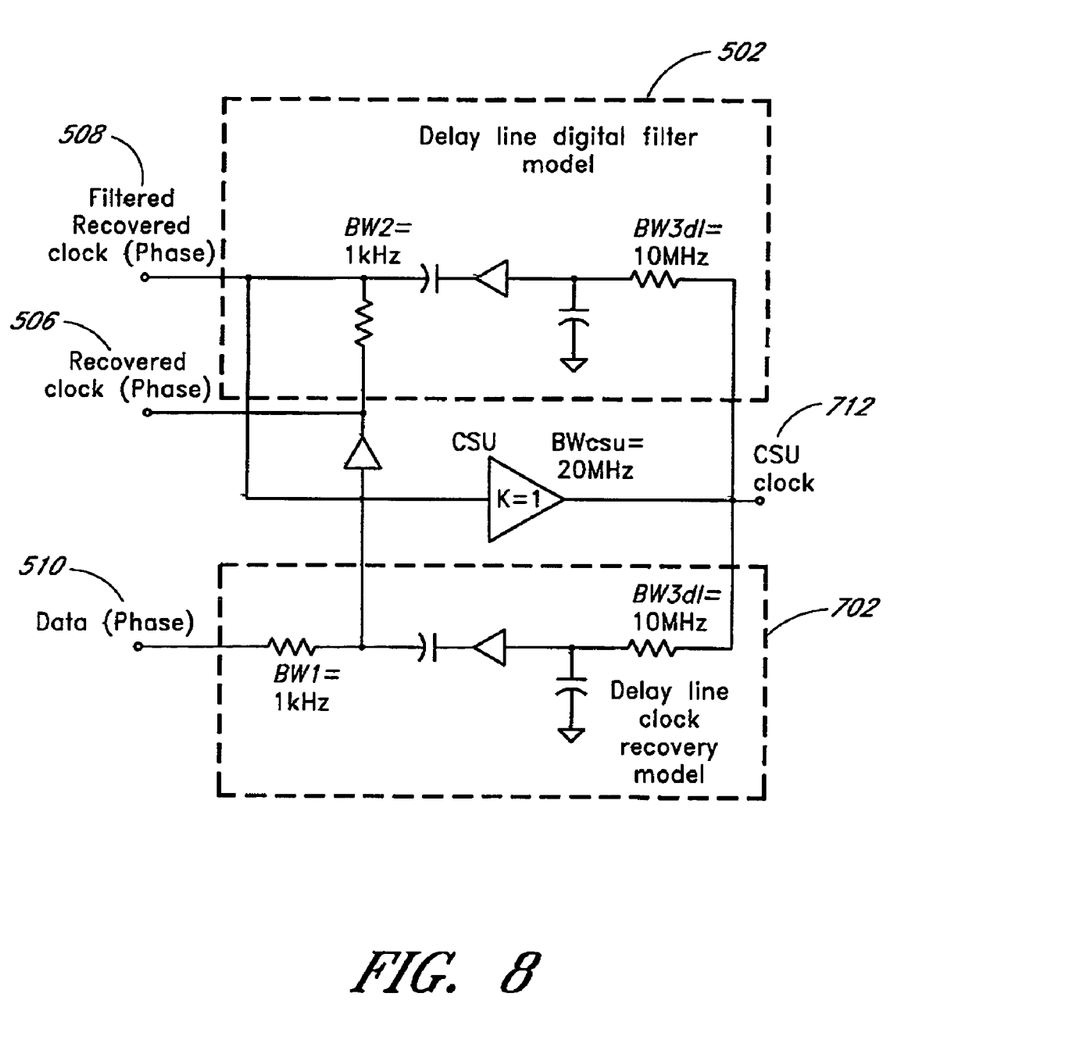
FIG. 8 illustrates a phase-domain equivalent model for the digital clock and data recovery circuit of FIG. 7.

A model of an equivalent circuit in phase domain for the digital clock recovery circuit of FIG. 7 is illustrated in FIG. 8. It will be understood that the values for the bandwidths are for the purposes of example and that other bandwidths will be readily determined by one of ordinary skill in the art. In the model, BW1 corresponds to the bandwidth of the primary digital clock recovery loop (Loop 1) 702. BW2 corresponds to the bandwidth of the second digital filter 502. BW3$dl$ corresponds to the bandwidth of the multi-tap delay lines with respect to the clock input and represents real-word behavior of the delay lines 602, 710. BWcsu represents the bandwidth of the phase transfer characteristic of the clock synthesis unit (CSU) 604.

For example, by setting the BW2 frequency to be a single dominant pole, loop stability for the jitter reduction technique can be achieved. It should be noted that the frequencies illustrated in FIG. 8 are for the purposes of illustration, and that embodiments are not limited to the frequencies shown.

The jitter reduction technique described earlier in connection with FIG. 7 uses a clock synthesis unit (CSU) 604 and not a voltage-controlled oscillator (VCO). A VCO should not be used with the architecture illustrated in FIG. 7 because of possible instability. As can be observed from FIG. 8, where a clock synthesis unit (CSU) 604 can be represented in the phase model with a band-limited unity gain buffer, a VCO would typically have a 1/s characteristic. This can undesirably render a corresponding system of FIG. 8 implemented with a VCO unstable because the loop is open at DC (at zero frequency).

While the jitter reduction technique can advantageously reduce a frequency-offset derived intrinsic jitter, the second digital filter 502 can further reduce a jitter component present in the data signal 510.

Figure 9:
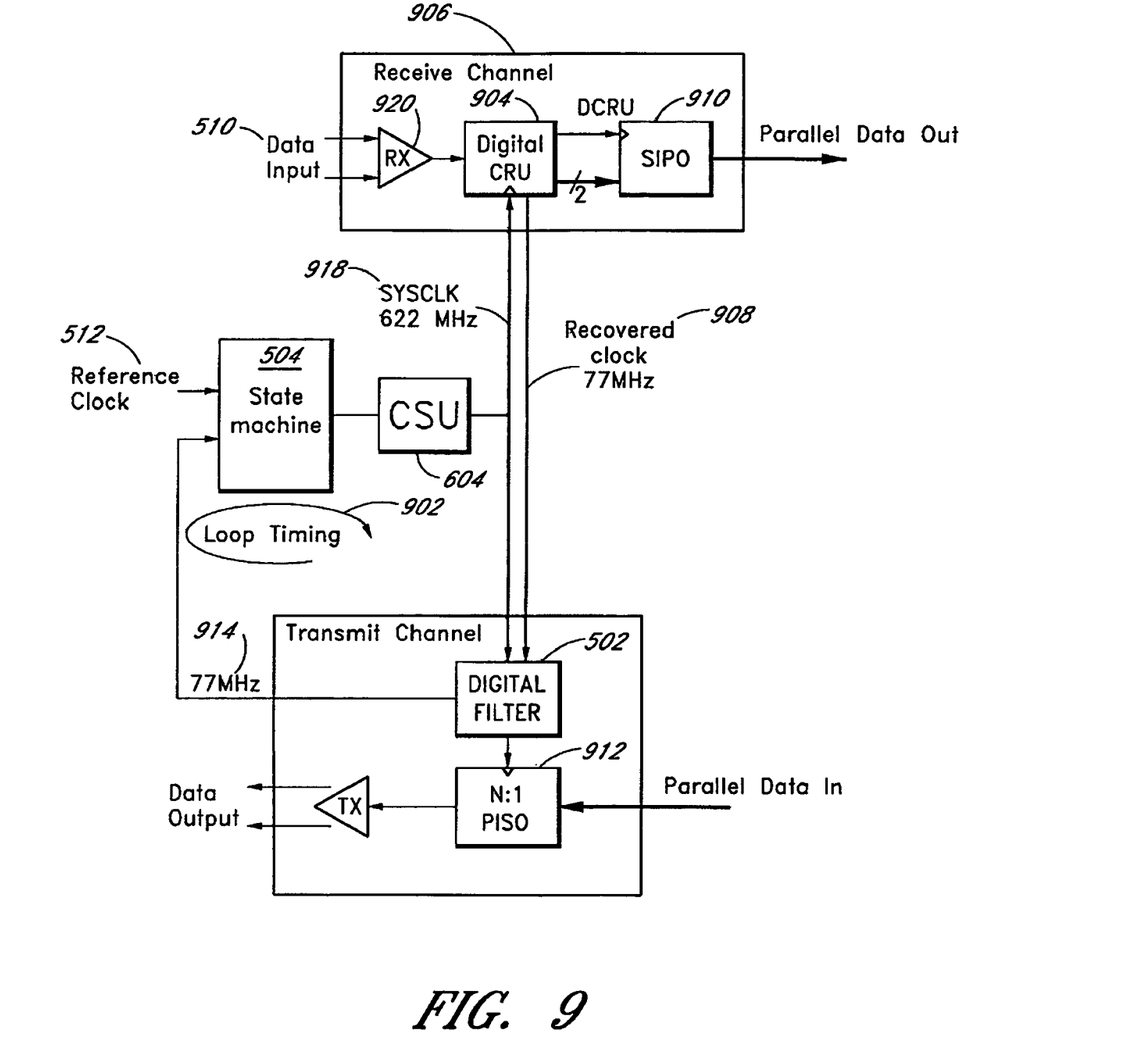
FIG. 9 illustrates an example of an embodiment intended for an OC-12 application.

FIG. 9 illustrates an embodiment of the invention in an OC-12 SONET application. Advantageously, jitter associated with loop timing 902 is reduced.

The digital clock recovery unit (DCRU) 904 of the digital clock and data recovery in the receive channel 906 extracts the data clock frequency and divides it down to a recovered 77 MHz clock signal 908. In the illustrated embodiment, a serial-in-parallel-out (SIPO) 910 deserializes the data signal 510. In a loop-timing mode, the extracted 77 MHz clock signal 908 is filtered with the second digital filter 502 and is provided as an input to the transmitter as a loop-timing clock, as illustrated by the N:1 parallel-in-serial-out (PISO) 912. It will be understood that N refers to a variable (which can be a fixed constant in a particular embodiment), and can be a different value than the N discussed earlier in connection with the number of taps of the delay lines of FIGS. 6 and 7. In the illustrated embodiment, the filtered 77 MHz clock signal 914 is provided as a reference clock signal to the clock synthesis unit (CSU) 916 via the state machine 504 and is used to generate a 622 MHz clock signal 918.

Corresponding structure between the embodiment described earlier in connection with FIG. 7 and the OC-12 embodiment of FIG. 9 will now be described. The signal path with the data signal 510 for the RX amplifier 920 of the receive channel 906, and from the RX amplifier 920 to the DCRU 904 of FIG. 9 corresponds to the data signal 510 applied as provided an input to the phase detector 304 illustrated near the bottom of FIG. 7. The DCRU 904 of FIG. 9 also includes the digital filter 306, the tap selection unit 606, and the N-tap delay line 602 illustrated near the bottom of FIG. 7.

The extracted clock 77 MHz clock signal 908 output of the DCRU 904 in FIG. 9 corresponds to the recovered clock output 506 of the tap selection unit 606 illustrated near the bottom of FIG. 7. The recovered 77 MHz clock signal 908 is provided as an input to the digital filter 502 of the transmit channel. The digital filter 502 of FIG. 9 corresponds to the second digital filter 502 illustrated in FIG. 7 so that the recovered 77 MHz clock signal 908 is provided as an input to the phase detector 704 of the second digital filter 502.

The filtered 77 MHz clock signal 914 output from the second digital filter 502 of FIG. 9 is provided as an input to the state machine 504 and corresponds to the output of the tap selection unit 708 of the digital filter 502 of FIG. 7. The state machine 504 and the CSU 604 have the same name in both figures. The SYSCLK 622 MHz output of the CSU 604 in FIG. 9 is provided as an input to the DCRU 904 of FIG. 9, corresponding to the N-tap delay line 602 of FIG. 7, and is also provided as an input to the second digital filter 502 of FIG. 9, corresponding to the M-tap delay line 710 of the second digital filter 502 of FIG. 7.

The principles and advantages described above can be used in a wide variety of applications. Embodiments may be particularly useful when employed in data repeaters, such as, but not limited to, SONET/SDH repeaters to lower loop timing jitter generation and jitter transfer.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. An apparatus comprising:
   a digital clock recovery unit configured to receive a data signal and a clock synthesis unit (CSU) clock signal, and configured to generate a recovered clock signal as an output from the data signal and from the CSU clock signal, wherein the digital clock recovery unit is part of a receive channel;
   a filter operatively coupled to the output of the digital clock recovery unit to receive the recovered clock signal as an input, the filter configured to low-pass filter the recovered clock signal to generate a filtered recovered clock signal; and
   a clock synthesis unit (CSU) operatively coupled to the output of the filter, the clock synthesis unit (CSU) configured to generate the CSU clock signal at least partially based on the filtered recovered clock signal such that jitter in the CSU clock signal is reduced;
   a state machine in a signal path between the filter and the CSU, the state machine having a first input operatively coupled to the filtered recovered clock signal and a second input operatively coupled to a local frequency reference signal, wherein the state machine is configured to initially select the second input as an input to the CSU, and then to select the first input as the input to the CSU when filtered recovered signal is within the frequency locking range of the CSU;
   wherein the digital clock recovery unit, the filter, and the clock synthesis unit (CSU) are arranged in a feedback loop such that filtering of the recovered clock signal by the filter is applied within the feedback loop.

2. The apparatus as defined in claim 1, wherein the filter comprises a digital phase-locked loop (digital PLL).

3. The apparatus as defined in claim 2, wherein the filter comprises:
   a phase detector having a first input and a second input, the first input operatively coupled to the recovered clock signal, the second input operatively coupled to the filtered recovered clock signal, the phase detector configured to generate an output indicating a phase comparison between signals received at the first input and the second input;
   a loop filter coupled to the output of the phase detector;
   a multiple-tap delay line with an input coupled to the CSU clock signal from the CSU; and
   a tap selection unit configured to select a tap of the multiple-tap delay line so that the filtered recovered clock signal is phase locked to the recovered clock signal.

4. The apparatus as defined in claim 1, wherein the filter comprises an analog phase-locked loop (analog PLL).

5. The apparatus as defined in claim 1, wherein the CSU is further configured to multiply the frequency of an output of the state machine to generate the CSU clock signal.

6. The apparatus as defined in claim 1, wherein the apparatus comprises an integrated circuit.

7. The apparatus as defined in claim 1, wherein the apparatus comprises a data repeater.

8. A method for recovering a clock signal from a data signal, the method comprising:
   initially selecting a local frequency reference signal as a reference signal, where the local frequency reference signal has a different time base than the data signal;
   generating a recovered clock signal based at least partially on the reference signal and the data signal;
   filtering the recovered clock signal with a low-pass filter to generate a processed signal;
   deselecting the local frequency reference signal as the reference signal and selecting the processed signal as a new reference signal when the processed signal is within a frequency locking range of a circuit that generates a timing reference signal, wherein when the local frequency reference signal is selected, the circuit operates in open loop and when the processed signal is selected, the circuit operates in closed loop; and
   using the new reference signal to generate the recovered clock signal from the data signal.

9. The method as defined in claim 8, wherein filtering the recovered clock signal further comprises filtering with a phase-locked-loop filter to generate the processed signal.

10. The method as defined in claim 9, wherein filtering further comprises filtering with a digital phase-locked-loop filter.

11. The method as defined in claim 10, wherein filtering further comprises:
    generating multiple phases of a clock signal at least partially based on the processed signal;
    detecting a difference in phase between the recovered clock signal and the processed signal;
    low-pass filtering the detected difference in phase; and
    selecting a phase of the multiple phases using the low-pass filtered detected difference to generate the processed signal.

12. The method as defined in claim 8, wherein filtering comprises using an analog phase-locked-loop filter.

13. The method as defined in claim 8, wherein the method is embodied in a data repeater circuit.

14. The apparatus as defined in claim 1, wherein the filter is part of a transmit channel.

* * * * *